United States Patent
Chen et al.

(10) Patent No.: US 11,970,645 B2
(45) Date of Patent: Apr. 30, 2024

(54) ANISOTROPIC CONDUCTIVE ADHESIVE, DISPLAY PANEL, AND DISPLAY DEVICE

(71) Applicant: Wuhan China Star Optoelectronics Semiconductor Display Technology Co., Ltd., Hubei (CN)

(72) Inventors: Yicheng Chen, Hubei (CN); Chi Hu, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 920 days.

(21) Appl. No.: 16/971,305

(22) PCT Filed: Jun. 19, 2020

(86) PCT No.: PCT/CN2020/097081
§ 371 (c)(1),
(2) Date: Aug. 20, 2020

(87) PCT Pub. No.: WO2021/227198
PCT Pub. Date: Nov. 18, 2021

(65) Prior Publication Data
US 2023/0128523 A1     Apr. 27, 2023

(30) Foreign Application Priority Data
May 15, 2020  (CN) .......................... 202010411453.9

(51) Int. Cl.
C09J 9/02      (2006.01)
C09J 11/04     (2006.01)
B32B 7/12      (2006.01)
B32B 15/04     (2006.01)

(52) U.S. Cl.
CPC ................. *C09J 9/02* (2013.01); *C09J 11/04* (2013.01); *B32B 7/12* (2013.01); *B32B 15/04* (2013.01); *C09J 2203/326* (2013.01); *C09J 2301/312* (2020.08); *C09J 2301/408* (2020.08)

(58) Field of Classification Search
CPC .. C09J 9/02; B32B 2264/105; B32B 2264/20; B32B 2264/203; C08K 2201/001
See application file for complete search history.

(56) References Cited

U.S. PATENT DOCUMENTS

| | | | |
|---|---|---|---|
| 2009/0068916 A1* | 3/2009 | Jang | ........................ H05K 3/323 |
| | | | 445/24 |
| 2014/0217450 A1* | 8/2014 | Ishigami | .................... C09J 9/00 |
| | | | 252/514 |

FOREIGN PATENT DOCUMENTS

| CN | 1782795   | 6/2006  |
|----|-----------|---------|
| CN | 101424803 | 5/2009  |
| CN | 106125410 | 11/2016 |
| CN | 107819015 | 3/2018  |
| CN | 109587939 | 4/2019  |

(Continued)

OTHER PUBLICATIONS

Translation KR-20150145345 (Year: 2015).*

(Continued)

*Primary Examiner* — Hoa (Holly) Le

(57) ABSTRACT

An anisotropic conductive adhesive, a display panel and a display device are provided. The anisotropic conductive adhesive includes an adhesive and a plurality of metal balls disposed in the adhesive. At least two annular grooves are defined by a surface of each of the metal balls.

10 Claims, 2 Drawing Sheets

(56) References Cited

FOREIGN PATENT DOCUMENTS

JP      2015-095498         5/2015
KR      20150145345 A   *  12/2015   ....... G02F 1/136286

OTHER PUBLICATIONS

Lin et al., A review of the influencing factors on anisotropic conductive adhesives joining technology in electrical applications, J Mater Sci (2008) 43:3072-3093—DOI 10.1007/s10853-007-2320-4 (Year: 2008).*

* cited by examiner

US 11,970,645 B2

ANISOTROPIC CONDUCTIVE ADHESIVE, DISPLAY PANEL, AND DISPLAY DEVICE

RELATED APPLICATIONS

This application is a National Phase of PCT Patent Application No. PCT/CN2020/097081 having International filing date of Jun. 19, 2020, which claims the benefit of priority of Chinese Patent Application No. 202010411453.9 filed on May 15, 2020. The contents of the above applications are all incorporated by reference as if fully set forth herein in their entirety.

FIELD AND BACKGROUND OF THE INVENTION

The present disclosure relates to the field of display technology, and more particularly, to an anisotropic conductive adhesive, a display panel, and a display device.

With the development of display technology, the demand for anisotropic conductive films (ACF) is increasing, and the anisotropic conductive films play an important role in the binding process. For example, all of the binding processes of COG, FOG, COP, COF, FOF, and FOP require the ACF to conduct the circuit. The principle thereof is that metal balls are present within the ACF adhesive. When the pressure is applied on the top and bottom of the anisotropic conductive film, the golden balls may deform to touch the top and bottom of the electrodes to conduct the circuit. During the pressing process, the flow of the ACF adhesive drives the movement of the circular conductive particles, resulting in a low capture rate of Bump conductive particles.

Technical Problem

In order to solve the above technical problem: the present invention provides an anisotropic conductive adhesive, a display panel and a display device, to solve the problem of uneven distribution of metal balls in the conventional anisotropic conductive adhesive, resulting in the technical problem of poor contact to the metal layer.

SUMMARY OF THE INVENTION

Technical Solution

The technical method to solve the technical problems described above is that: the present disclosure provides an anisotropic conductive adhesive, and the anisotropic conductive adhesive comprises an adhesive and a plurality of metal balls disposed in the adhesive. At least two annular grooves are defined by a surface of each of the metal balls.

Further, a center of a center loop of each of the annular grooves overlaps with a center of the corresponding metal ball.

Further, a width of each of the annular grooves is 0.1-0.5 μm.

Further, a depth of each of the annular grooves recessed into the surface of each of the metal balls is 0.1-0.5 μm.

The present disclosure further provides a display panel. The display panel comprises the anisotropic conductive adhesive.

Further, the display panel further comprises an OLED substrate and a flip-clip film. A plurality of first metal layers are disposed evenly on a surface of the OLED substrate. The flip-chip film is disposed opposite the OLED substrate. A plurality of second metal layers are disposed evenly on a surface of the flip-chip film facing the OLED substrate.

Further, the first metal layers are disposed opposite the second metal layers, and a gap is existed between the first metal layers and the second metal layers.

Further, a size of the gap is smaller than a diameter of each of the metal balls.

Further, the anisotropic conductive adhesive is disposed between the OLED substrate and the flip-chip film. At least one outer surface of each of the metal balls is tangent to a surface of the first metal layer, and the outer surface of each of the metal balls is tangent to a surface of the second metal layer.

The present disclosure further provides a display device. The display device comprises the display panel.

Beneficial Effects

The beneficial effects of the present disclosure are that the anisotropic conductive adhesive, the display panel, and the display device of the present disclosure may enhance the fixing ability and deformation ability of the metal balls during the binding and pressing process, thereby enhancing the conductive ability of the binding pressing area and enhancing the performance of the display panel.

BRIEF DESCRIPTION OF THE SEVERAL VIEWS OF THE DRAWINGS

The technical solutions of the present disclosure and other beneficial effects may become obvious by describing the specific embodiments of the present application in detail below in combination with the drawings.

Symbols in the drawings.

Figure 1:
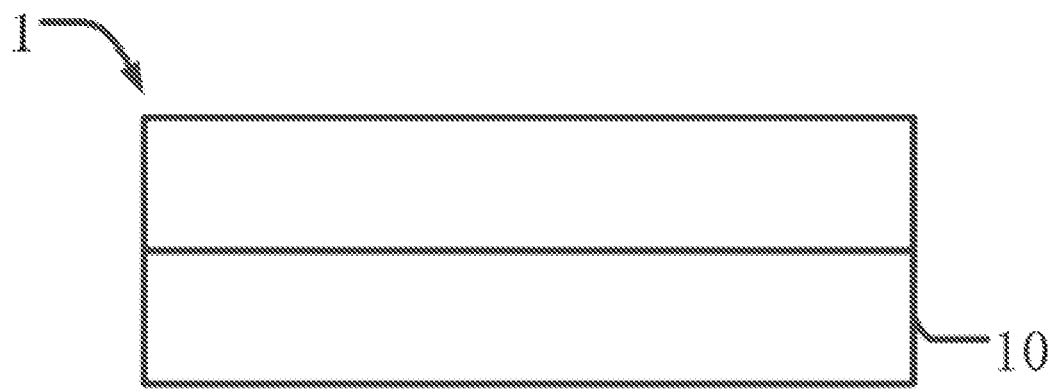
FIG. 1 is a schematic view of a display device according to one embodiment of the present disclosure.

| 1 display device; | 10 display panel; |
|---|---|
| 110 OLED layer; | 120 flip-chip film layer; |
| 130 anisotropic conductive adhesive; | 111 first substrate; |
| 112 first metal layer; | 121 second substrate; |
| 122 second metal layer; | 131 adhesive; |
| 132 metal ball. | |

DESCRIPTION OF SPECIFIC EMBODIMENTS OF THE INVENTION

The technical solutions in the embodiments of the present disclosure will be described clearly and completely in combined with the drawings shown in the embodiments of the present disclosure. Obviously, the described embodiments are only one part of the embodiments of the present disclosure, but not all of the embodiments. Based on the embodiments of the present disclosure, all other embodiments obtained by a person skilled in the art without making creative efforts fall within the claim scope of the present disclosure.

The following disclosure provides many different embodiments or examples for implementing different structures of the present application. In order to simplify the disclosure of the present application, the components and arrangements of specific examples are described below. Of course, they are merely examples, and the purpose thereof is not to limit the present application. In addition, the present application may repeat the reference numerals and/or reference letters in different examples. Such repetition is for the purpose of simplicity and clarity, and the repetition itself does not indicate the relationship between the various embodiments and/or arrangements discussed. In addition, the present application provides examples of various specific processes and materials, but a skilled person in the art may anticipate the application of other processes and/or the use of other materials.

Embodiments

Figure 2:
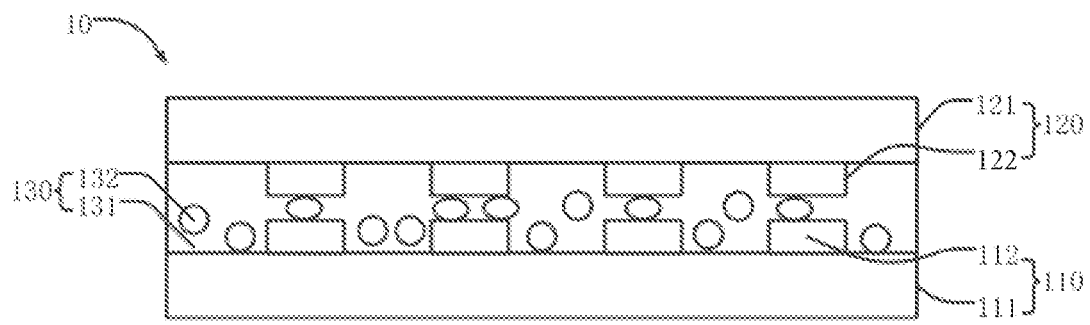
FIG. 2 is a schematic view of a display panel according to one embodiment of the present disclosure.

In the present embodiment, as shown in FIG. 1, the display device 1 of the present disclosure comprises a display panel 10. As shown in FIG. 2, the display panel 10 comprises an organic light emitting diode (OLED) layer 110, a flip-chip film layer 120 and an anisotropic conductive adhesive 130.

The OLED layer 110 comprises a first substrate 111 and a first metal layer 112 disposed on the first substrate 111. The first metal layer 112 is evenly distributed on a surface of the first substrate 111. A gap is existed between the two adjacent first metal layers 112 to avoid crosstalk of electrical signals between the adjacent first metal layers 112.

The flip-chip film layer 120 is disposed opposite the OLED layer 110. The flip-chip film layer 120 comprises a second substrate 121 and a second metal layer 122 disposed on the second substrate 121. The second metal layer 122 is evenly distributed on a surface of the second substrate 121 facing the surface of the first substrate 111, and the second metal layer 122 is disposed opposite the first metal layer 112.

When the display panel 10 is formed, an electrical signal needs to be transferred between the first metal layer 112 and the second metal layer 122. In order to avoid no contact between the first metal layer 112 and the second metal layer 122 and poor signal of the display panel 10 due to the uneven thickness of the first metal layer 112 and the second metal layer 122, the anisotropic conductive adhesive 130 is used to adhere the OLED layer 110 to the flip-chip film layer 120. Specifically, the anisotropic conductive adhesive 130 comprises an adhesive 131 and metal balls 132. The metal balls 132 are mixed with the adhesive and are evenly disposed between the first metal layer 112 and the second metal layer 122. Since the material of the metal balls 132 is a metal material with desired conductive properties. In use, the metal balls disposed between the first metal layer 112 and the second metal layer 122 are deformed by pressing through the pressing technique, and the electrical signals may be transferred between the first metal layer 112 and the second metal layer 122 through the metal balls 132. The anisotropic conductive adhesive 130 is electrically conductive. Since the opposite surfaces of the first metal layer 112 and the second metal layer 122 are both smooth surfaces, and the adhesive 131 of the anisotropic conductive adhesive 130 has fluidity, during the pressing process, parts of the metal balls 132 between the first metal layer 112 and the second metal layer 122 may be pressed into the gap between the first metal layers 112 or the second metal layers 122, thereby affecting the electrical connection between the first metal layer 112 and the second metal layer 122. In the present embodiment, the surface roughness of the metal ball 132 is increased by modifying the surface shape of the metal ball 132.

Figure 3:
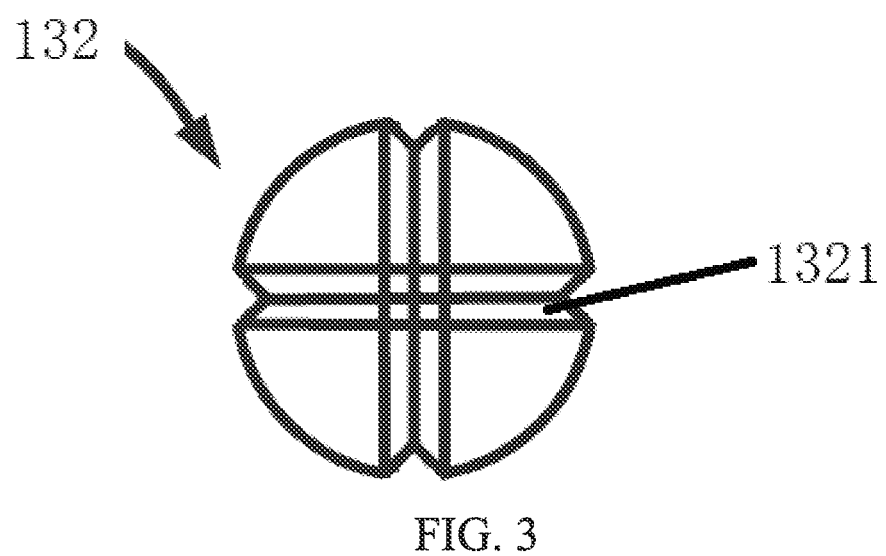
FIG. 3 is a schematic view of a metal ball according to one embodiment of the present disclosure.

Specifically, as shown in FIG. 3, a plurality of annular grooves 1321 are defined by a surface of the metal ball 132 in the present embodiment. A center of a center loop of any one of the annular grooves 1321 overlaps with a center of the metal ball 132. That is, any two annular grooves 1321 both have only two intersections, and their intersections are connected in a line through the center of the metal ball 132. In the present embodiment, a cross section of the annular groove 1321 is a triangle. In other preferred embodiments of the present disclosure, the cross-section of the annular groove may also be a semicircle, a rectangle, or a polygon.

A width of the annular groove 1321 is 0.1-0.5 μm, which may increase the surface roughness of the metal ball 132. During the pressing process, due to the present of the annular groove 1321, the metal ball 132 may be stably disposed between the first metal layer 112 and the second metal layer 122, thereby enhancing the conductive effect between the first metal layer 112 and the second metal layer 122.

A depth of the annular groove 1321 is 0.1-0.5 μm. That is, the depth of the annular groove 1321 recessed into the surface of the metal ball is 0.1-0.5 μm, which may not affect the rigidity of the metal ball 132 itself. The deformation effect of the metal ball 132 may also be enhanced by increasing the cracking degree of the metal ball during the pressing process, thereby increasing the area between the metal ball 132 and the first metal layer 112, and the area between the metal ball and the second metal layer 122, and enhancing the conductive properties between the first metal layer 112 and the second metal layer 122.

Moreover, since a plurality of annular grooves 1321 are defined by the surface of the metal ball 132, the pressure required for the deformation of the metal ball 132 is reduced. Therefore, the low-pressure pressing technology which reduces from original 180 N to 80 N may save energy and also protect the display panel 10 by avoiding the poor display of the display panel 10 resulting from excessive pressure.

The beneficial effects of the present embodiment are that: the anisotropic conductive adhesive, the display panel and the display device of the present embodiment may enhance the fixing ability of the metal balls during the binding and pressing process by increasing the surface roughness of the metal balls. The plurality of annular grooves defined by the metal balls may increase the cracking degree of the metal balls, which is beneficial to achieve a better deformation effect, thereby enhancing the conductive ability of the binding pressing area and enhancing the performance of the display panel. The deformation stress may be reduced, thereby reducing the stress during the binding pressing process, and the energy is saved.

The descriptions of the above embodiments are merely used to help understand the technical solutions and core concepts of the present application. A person ordinarily skilled in the art should understand that they can still modify the technical solutions described in the foregoing embodiments, or equivalently replace some of the technical features; and these modifications or replacements do not deviate the essence of the corresponding technical solutions from the scope of the technical solutions of the embodiments of the present application.

What is claimed is:
1. An anisotropic conductive adhesive that is electrically conductive, comprising:
  an adhesive;
  a plurality of metal balls disposed in the adhesive, wherein at least two annular grooves are defined by a surface of each of the metal balls.

2. The anisotropic conductive adhesive according to claim 1, wherein a center of a center loop of each of the annular grooves overlaps with a center of the corresponding metal ball.

3. The anisotropic conductive adhesive according to claim 1, wherein a width of each of the annular grooves is 0.1-0.5 μm.

4. The anisotropic conductive adhesive according to claim 1, wherein a depth of each of the annular grooves recessed into the surface of each of the metal balls is 0.1-0.5 μm.

5. A display panel, comprising an anisotropic conductive adhesive according to claim 1.

6. The display panel according to claim 5, further comprising:
- an OLED substrate, wherein a plurality of first metal layers are disposed evenly on a surface of the OLED substrate;
- a flip-chip film disposed opposite to the OLED substrate, wherein a plurality of second metal layers are disposed evenly on a surface of the flip-chip film facing the OLED substrate.

7. The display panel according to claim 6, wherein the first metal layers are disposed opposite to the second metal layers, and a gap is existed between the first metal layers and the second metal layers.

8. The display panel according to claim 7 wherein a size of the gap is smaller than a diameter of each of the metal balls.

9. The display panel according to claim 7, wherein the anisotropic conductive adhesive is disposed between the OLED substrate and the flip-chip film, at least one outer surface of each of the metal balls is tangent to a surface of the first metal layer, and the outer surface of each of the metal balls is tangent to a surface of the second metal layer.

10. A display device, comprising a display panel according to claim 5.

* * * * *